(12) United States Patent
Champaigne et al.

(10) Patent No.: US 11,768,089 B2
(45) Date of Patent: Sep. 26, 2023

(54) ADAPTIVE MAGNETIC FIELD CANCELLATION

(71) Applicant: Electronics Inc., Mishawaka, IN (US)

(72) Inventors: Jack M. Champaigne, Mishawaka, IN (US); Mark A. Ingram, Granger, IN (US)

(73) Assignee: Electronics, Inc., Mishawaka, IN (US)

( * ) Notice: Subject to any disclaimer, the term of this patent is extended or adjusted under 35 U.S.C. 154(b) by 536 days.

(21) Appl. No.: 16/908,202

(22) Filed: Jun. 22, 2020

(65) Prior Publication Data
US 2020/0400469 A1    Dec. 24, 2020

Related U.S. Application Data

(60) Provisional application No. 62/864,701, filed on Jun. 21, 2019.

(51) Int. Cl.
| | |
|---|---|
| *F16K 31/08* | (2006.01) |
| *B24C 7/00* | (2006.01) |
| *G01F 1/075* | (2006.01) |
| *G05D 7/06* | (2006.01) |
| *B24C 1/10* | (2006.01) |

(52) U.S. Cl.
CPC ............ *G01F 1/075* (2013.01); *F16K 31/082* (2013.01); *G05D 7/0605* (2013.01); *B24C 1/10* (2013.01); *B24C 7/0053* (2013.01)

(58) Field of Classification Search
CPC ... G01F 1/58; G01F 1/586; G01F 1/64; F16K 31/06; F16K 31/08; F16K 31/082; B24C 7/00; B24C 7/0046; B24C 7/0053
See application file for complete search history.

(56) References Cited

U.S. PATENT DOCUMENTS

2019/0337121 A1\* 11/2019 Cheng .................. B24C 7/0069

\* cited by examiner

*Primary Examiner* — Erika J. Villaluna
(74) *Attorney, Agent, or Firm* — Botkin & Hall, LLP

(57) ABSTRACT

A valve with permanent magnet(s) and electro-magnet coils magnetically coupled to the permanent magnet(s). The valve is positioned below an inlet for receiving media. The amount of media flow may be regulated by controlling the current to the coils for partial or full flow. With no power applied to the electro-magnet coils, the media flow is inhibited. Application of a current to the electro-magnet coils will block the flux in the pole pieces rendering the working gap free of magnetic flux and thus allowing media to freely flow. As it is used, the media may become magnetized, altering the flow properties and causing magnetized media to bridge across the working gap. A magnetic sensor detects the amount of flux in the working gap to provide a signal to a control system. The signal allows closed loop control of the coils as media becomes magnetized, allowing consistent flow properties during use.

6 Claims, 10 Drawing Sheets

ADAPTIVE MAGNETIC FIELD CANCELLATION

CROSS REFERENCE TO RELATED APPLICATIONS

This application claims the benefit and priority of U.S. provisional application 62/864,701, filed Jun. 21, 2019, which application is hereby incorporated by reference.

BACKGROUND OF THE INVENTION

This invention relates to improving the flow of media in shot peening, blast cleaning, and similar equipment. Iron or steel granules, also called shot or grit, are used in abrasive blast cleaning, granite cutting, shot peening and other applications. The valve will have soft iron pole pieces to direct the flux from the magnet and then into the working gap where the media flow is regulated. Coils interposed on the pole pieces may interrupt the magnetic flux by suitable application of current. The efficiency of such equipment depends upon media flowing freely through the apparatus and impacting upon the workpiece being treated. However, the flow characteristics of the media vary widely during operation of the equipment. Commonly, the media is directed against the workpiece and then collected and recycled through the equipment.

Cast steel shot typically does not have significant remanence to interfere with the operation of the magnetic valve. However, stainless steel cut wire blast media will transition from austenitic to martensitic condition allowing it to exhibit significant remanence. This condition may be severe enough that the media will not flow even if the "Neutral Field Current" (NFC) has blocked all the magnet flux in the working gap of the valve because of the residual magnetism in the media. The cut wire particles act like miniature magnets aligned in the working gap with sufficient strength to bond and bridge without flowing. The cut wire particles in aggregate behave like a larger magnet.

This invention relates to using a magnetic flow valve, and the method and apparatus to compensate for when blast media acquires magnetic properties during use. Such media materials are subject to magnetic remanence or memory which causes reduced flow capability because of the magnetic remanence or memory. This invention reduces, overcomes, or eliminates the effect of this magnetic influence and thereby improves the flow characteristics of the media. Media can become "magnetized" by a variety of methods, especially by impact with a surface. As this media is re-cycled through the machine during treatment of a workpiece, its remanence tends to increase and its ability to flow smoothly is reduced, sometimes to the point of complete blockage of the flow-regulating device or passages.

It has been demonstrated that application of additional current to the coil, above that needed for NFC, will act in a way to repel the action of the "miniature magnets" and media flow can be performed. The amount of Neutral Field Current "Overdrive" above the NFC will depend upon the amount of remanence of the media. Since additional cold working of the media takes place in the shot peening application the remanence level of the media is not constant. It will tend to increase with increased use. For this reason, the "Effective Neutral Field Current" (ENFC) must be adjusted to a level greater than NFC so as to achieve no magnetic field in the working gap.

The ENFC may be adjusted manually with experimentation if the remanence is expected to stabilize. This may be satisfactory for some applications. However, there could be other applications where the remanence varies with time, such as addition of new media into the machine. A technique to adaptively adjust the coil current to counteract the magnetic field in the working gap caused by the media is needed.

SUMMARY OF THE INVENTION

The invention described herein uses a magnetic sensor located in the working gap of a magnetic valve. Where the remanence of media varies with time, such as addition of new media into the machine, the magnetic field in the working gap is measured to control the coils in a closed loop system.

DESCRIPTION OF THE PREFERRED EMBODIMENT

Figure 1:
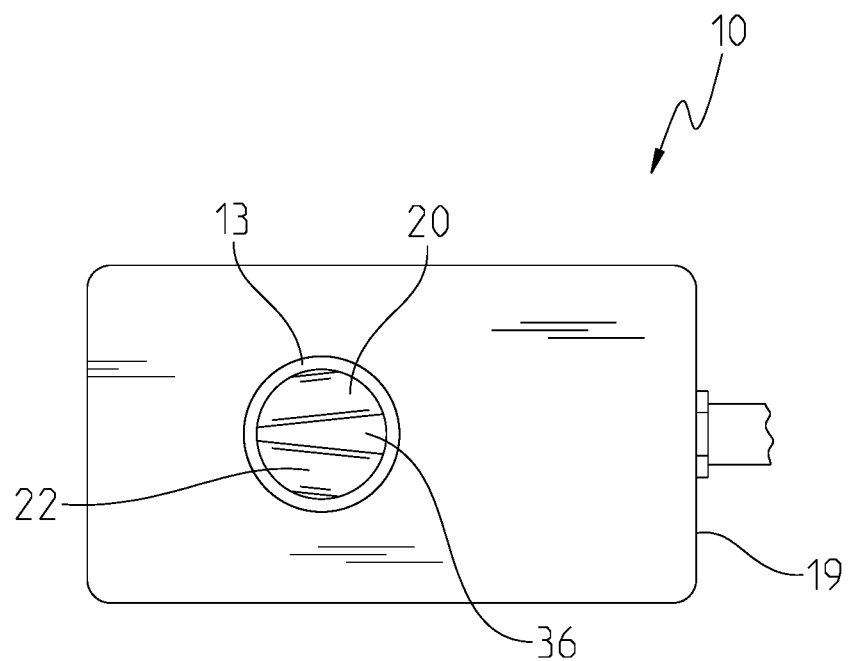
FIG. 1 is a top view of a magnetic valve.
Figure 2:
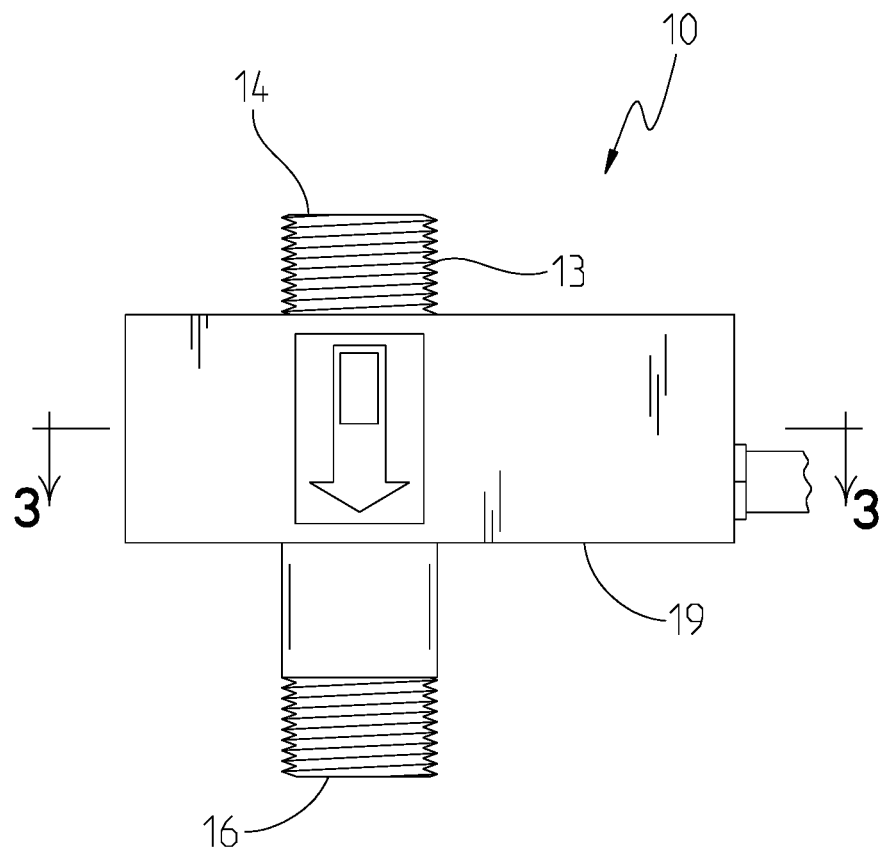
FIG. 2 is a side view of the magnetic valve in FIG. 1.

A magnetic flow valve 10 is shown in FIGS. 1 and 2 regulates the flow of media 12. The valve 10 is commonly used in a media blasting system that dispenses media 12 into a stream of fluid (commonly air) that impacts a part to be surface treated. The valve 10 has a pipe 13 that receives and guides the flow of media 12 with an inlet 14 that receives media and an outlet 16 where media is dispensed. The media 12 has magnetic properties, meaning it responds to an external magnetic field.

Figure 7:
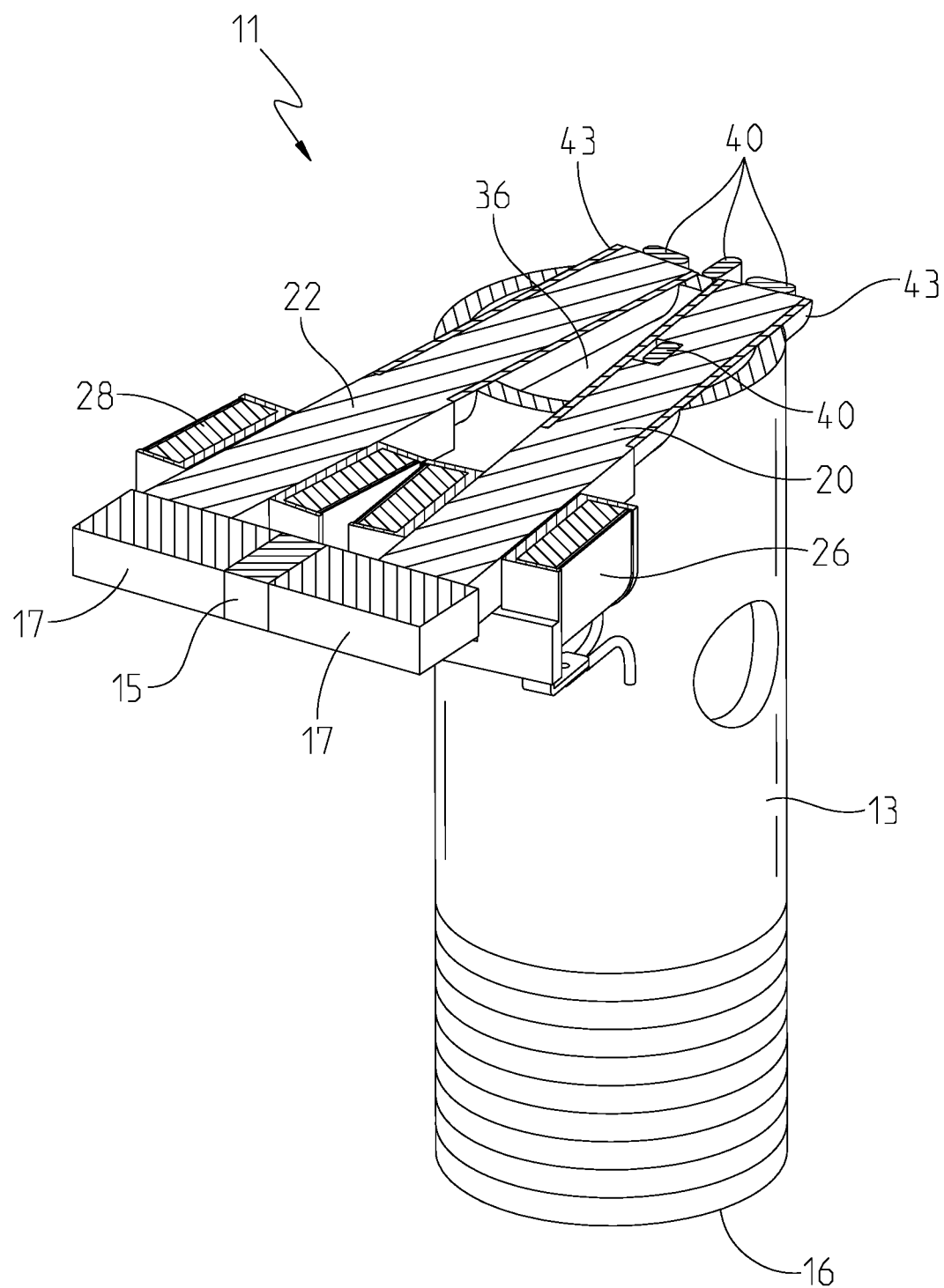
FIG. 7 is a section view of a magnetic valve using a single permanent magnet.
Figure 8:
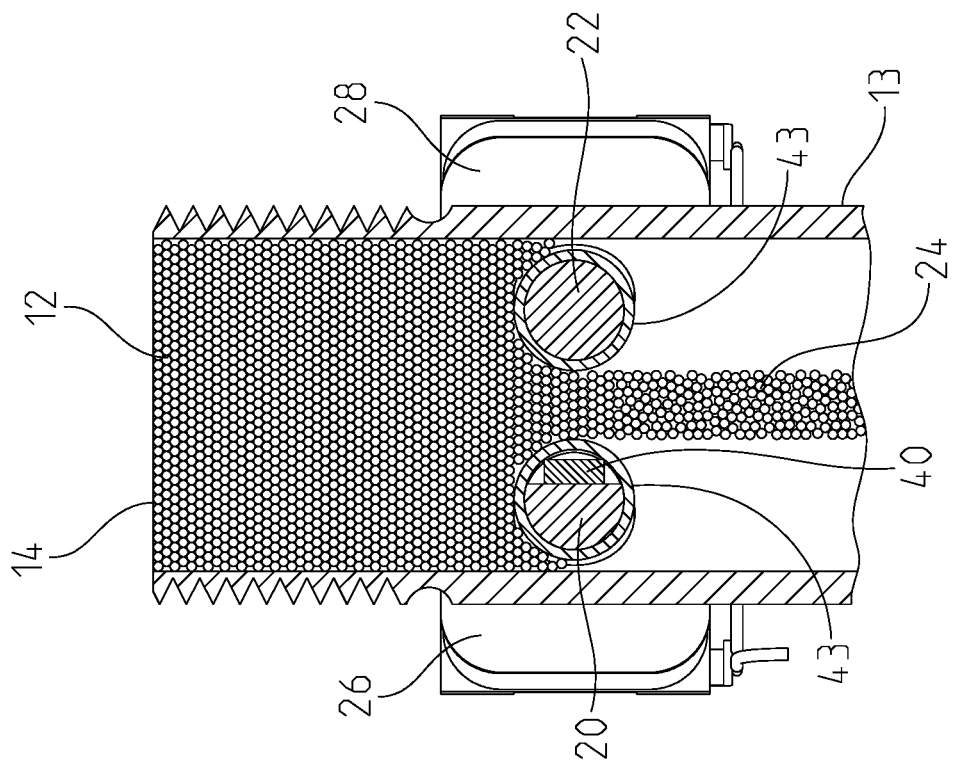
FIG. 8 is a section view through the pole pieces of the valve shown in FIG. 7 with the valve in the off condition and blocking media from falling through the valve.
Figure 9:
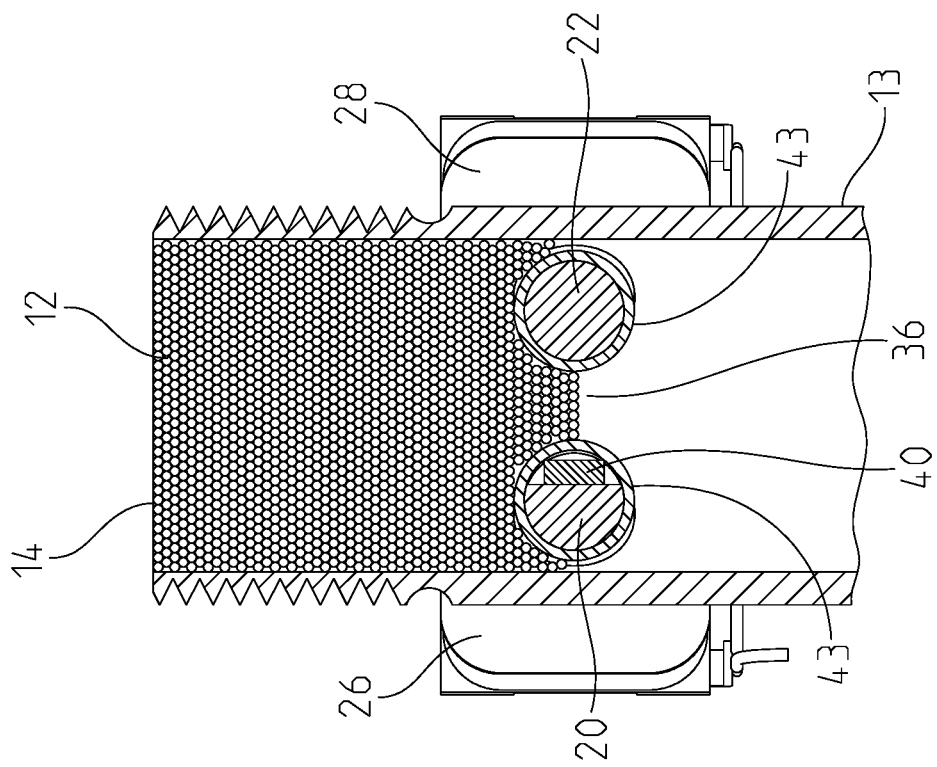
FIG. 9 is the valve shown in FIG. 8 in the on position with the media falling through the valve.
Figure 10:
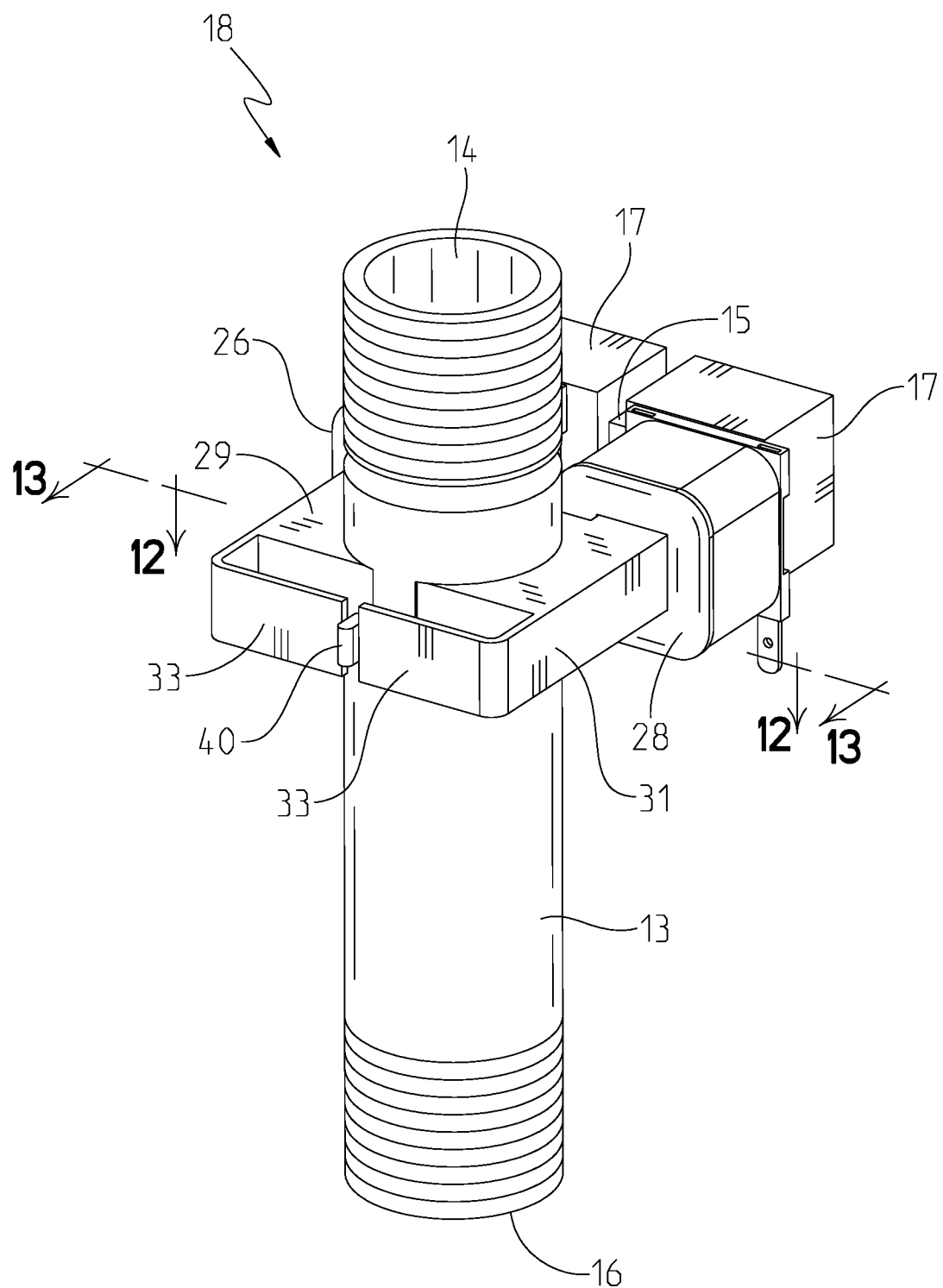
FIG. 10 is a valve having is a perspective view of a valve having pole pieces that extend outside of the pipe for media flow to conduct the magnetic field toward a Hall chip.
Figure 11:
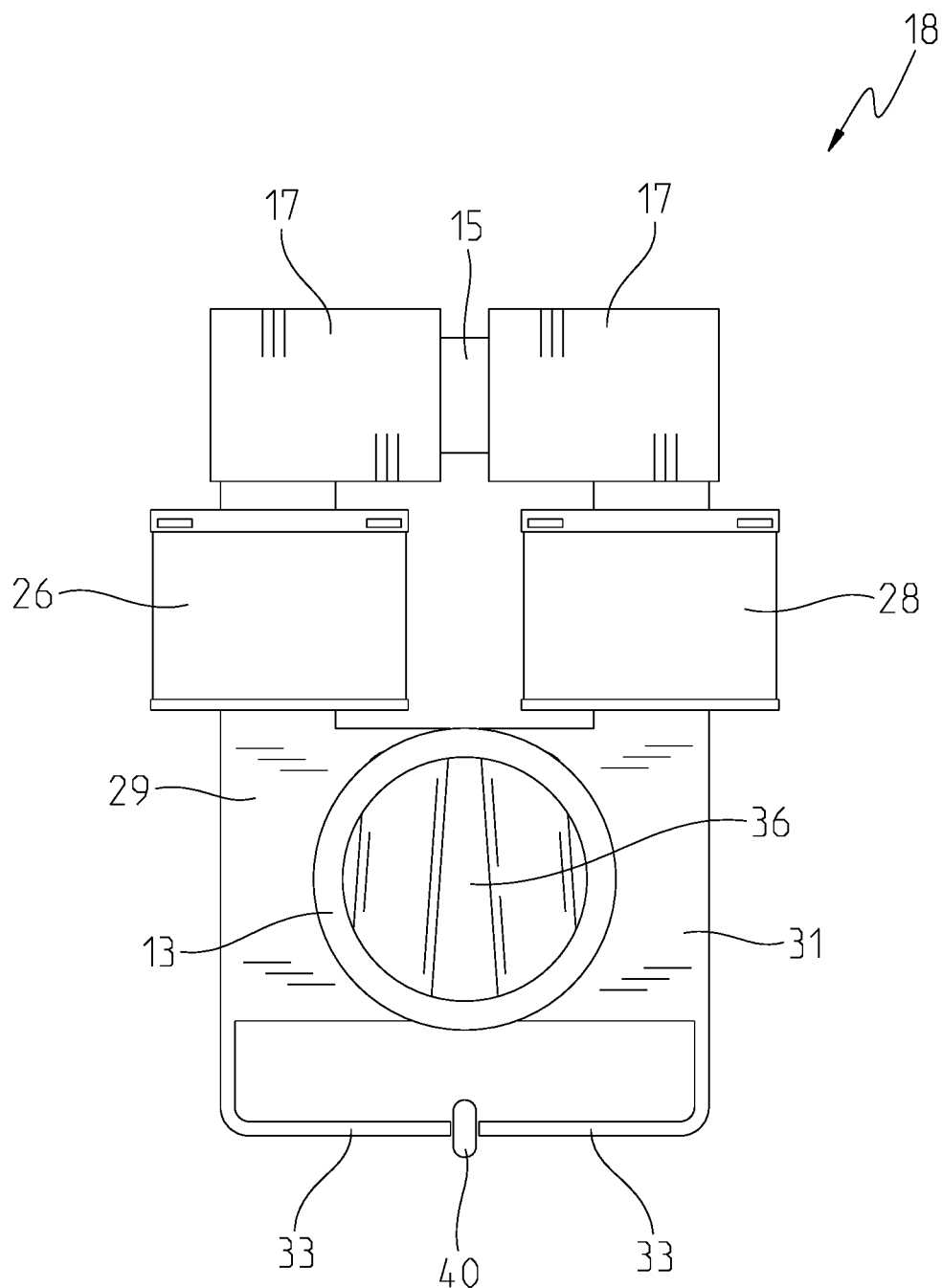
FIG. 11 is a top view of the valve shown in FIG. 10.
Figure 12:
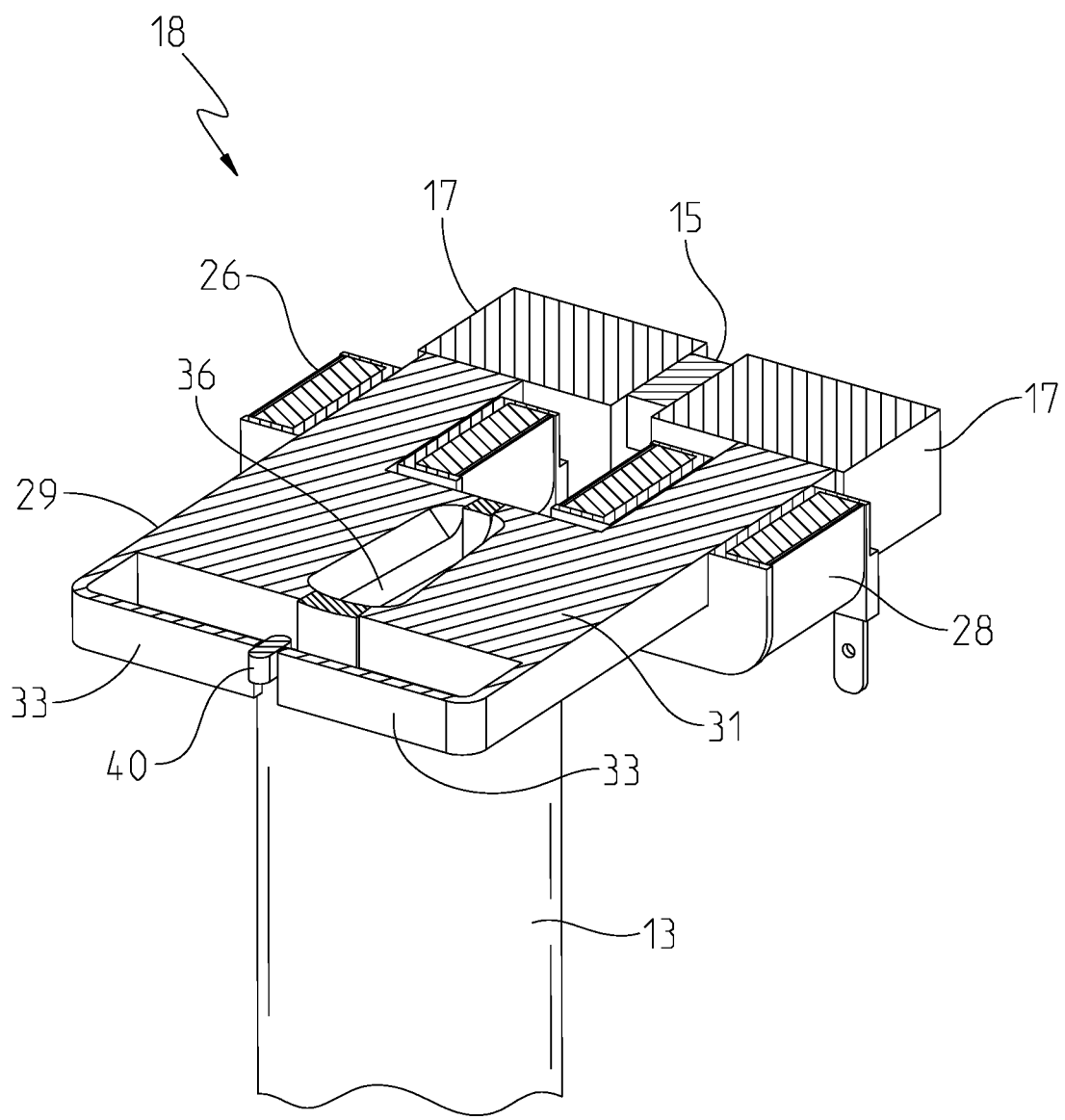
FIG. 12 is a section view of the valve in FIG. 10 taken through line 12-12 in FIG. 10 through the pole pieces.
Figure 13:
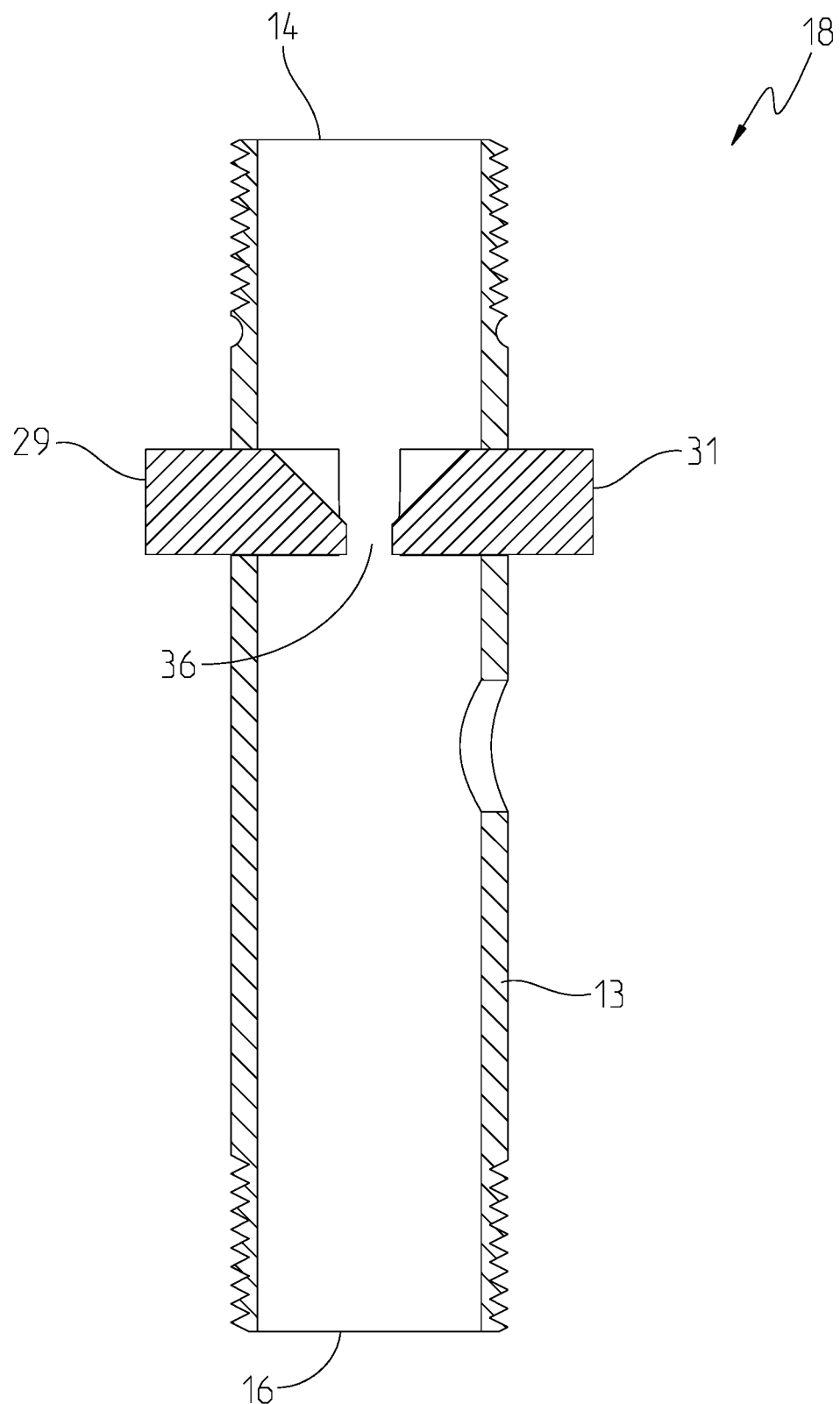
FIG. 13 is a section view of the valve in FIG. 10 taken about line 13-13 in FIG. 10.

The valve 10 has pole pieces 20, 22 that are made from soft magnetic material. The pole pieces 20, 22 extend transversely through the pipe 13. It is contemplated that any magnetically conductive material would be suitable for making the pole pieces 20, 22. Portions of the pole pieces are located in the flow path 24, visible in FIG. 3. FIGS. 1 and 2 show a housing 19 that encloses the location of the pipe 13 where thee pole pieces 20, 22 are located. The pole pieces 20, 22 have corresponding coils 26, 28 that generate a magnetic field when electric current is passed through them. The pole pieces 20, 22 have corresponding permanent magnets 30, 32 that are connected with a shunt 34. The shunt 34 and pole pieces 20, 22 are magnetically conductive. When the valve 10 is in the "off" position, the magnetic field travels from the magnets 30, 32, through the pole pieces 20, 22, shunt 34, and a working gap 36. The working gap 36 is the area between the pole pieces 20, 22 within the pipe 13. In this manner, the magnets 30, 32; pole pieces 20, 22; and shunt 34 form a magnetically conductive loop. When no current is present in the coils, the magnetic field from the permanent magnets 30, 32 is conducted through the magnetic loop and specifically through the pole pieces 20, 22 into the working gap 36. Media 12 that enters the gap 36 becomes trapped by the magnetic field when no current flows through the coils 26, 28 and the valve is in the "off" position. In the "on" position, the magnetic field from the magnets 30, 32 is blocked by an opposing field generated by the coils 26, 28. In this manner, the coils 26, 28 are magnetically coupled with the pole pieces and this magnetic coupling allows the coils 26, 28 to work with or against the magnets 30, 32. The valve 10 described herein is merely an example and other valve configurations are contemplated. For example, the valve could utilize a different number of coils, magnets, or pole pieces. It is contemplated that it may be possible to have a single pole piece that extends transversely through the pipe 13 and in that case the working gap would be the area between the pole piece and the pipe 13. FIG. 7 shows a magnetic flow valve 11 having a single permanent magnet 15 and having two magnetically conductive spacer blocks 17.

In this case, the coils 26, 28 surround the pole pieces 20, 22 in the same manner as in FIGS. 1-5 and spacer blocks 17 conduct the magnetic field from the magnet 15 to the pole pieces 20, 22. By increasing or decreasing the current through the coils 26, 28, the valve 10, 11 is controllable between the on and off positions to regulate the flow of media 12. The coils 26, 28 are used to oppose the magnetic field generated by the permanent magnets 30, 32. As shown in FIG. 7, the coils 26, 28 could be used to oppose the magnetic field generated by the single magnet 15 located between the spacer blocks 17. It is contemplated that the coils 26, 28 could be used to increase the magnetic field. While the coils 26, 28 are shown on the pole pieces 20, 22, it is contemplated that the coils could extend over or be located on the magnets 15, 30, 32. In the configurations discussed above, the coils 26, 28 are magnetically coupled with the magnets 15, 30, 32 that form the magnetic loop.

By using electrical current in the coils 26, 28 to block the magnetic field from the magnets 15, 30, 32, the magnetic field in the working gap 36 drops to a near zero or zero value, allowing any media 12 to pass through. The amount of current that achieves a zero (or near zero) magnetic field (measured in Gauss level) in the working gap 36 is referred to as "Neutral Field Current" (NFC). During application of NFC, the media will freely flow without magnetic hindrance thus providing the maximum media flow rate. The Neutral Field Current may be regulated to achieve various levels of media flow as desired.

With media 12 that has very little remanence, the amount of current in the coils 26, 28 can be predictably correlated to magnetic field in the working gap 36. However, some media is used for blasting picks up undesirable magnetic properties that negatively impact proper valve operation. This is particularly true of stainless steel cut wire media. Remanence is increased during use, resulting in the individual particles of blast media having residual magnetism. The residual magnetism creates a flow restriction in the working gap 36 as the particles clump together. Further, the response curve of the valve 10 is altered as the magnetized or increased-remanence particles pass through or build up in the working gap 36. This causes unpredictable valve operation, making the flow of media 12 through the valve 10 difficult to control, particularly as the media 12 ages.

Figure 3:
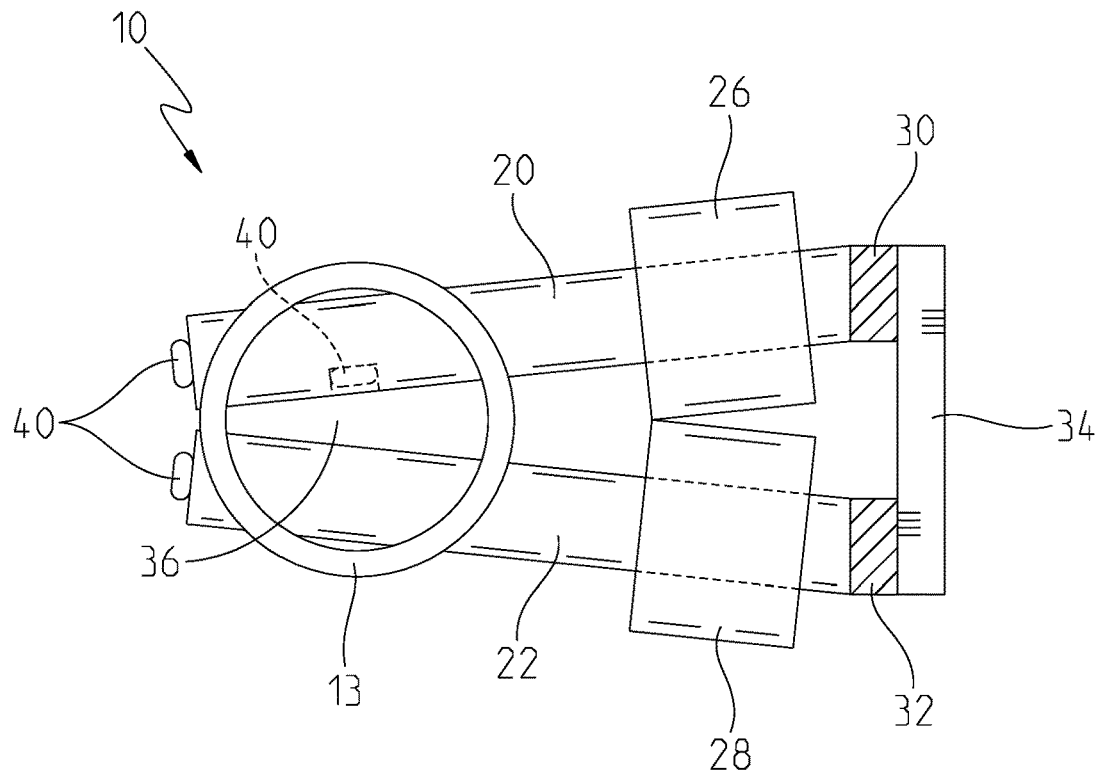
FIG. 3 is a section view 3-3 of the magnetic valve in FIG. 1 with its outside housing removed.
Figure 4:
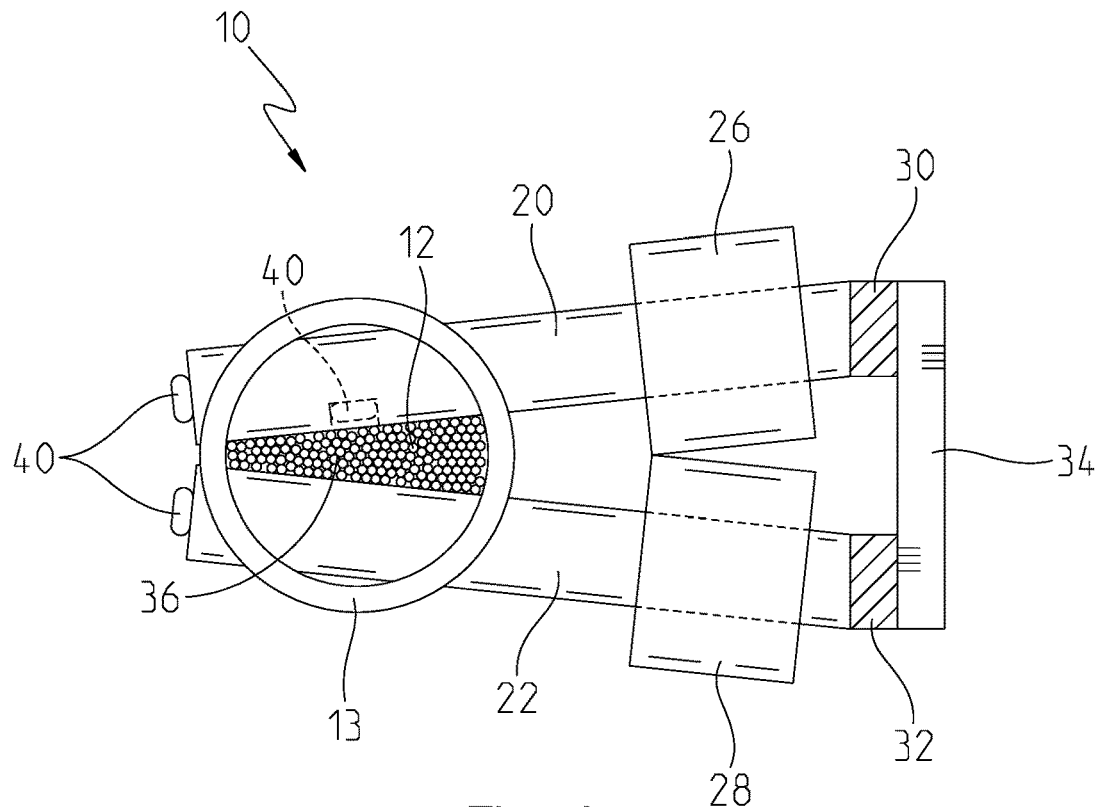
FIG. 4 is a section view 3-3 of the magnetic valve in FIG. 1 with media present in the closed position.
Figure 5:
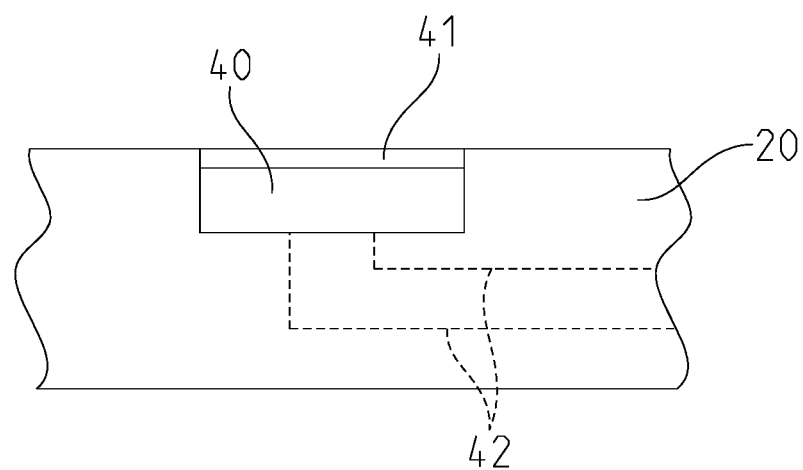
FIG. 5 is partial view 5 of the valve in FIG. 3 showing a Hall chip in a pole piece.

By placing a magnetic sensor 40 in the working gap 36, the magnetic field in the working gap 36 can be accurately measured. It should be noted that Hall chip and magnetic sensor 40 will be used interchangeably throughout this specification because the magnetic sensor 40 is typically a Hall chip, but the magnetic sensor may be a similar device that can sense a magnetic field. Having the Hall chip 40 within the flow path can provide a good signal condition on which to measure the magnetic field in the working gap 36, but it is subject to abrasion/erosion and destruction due to flow of media. If placed in the flow path, as shown in FIGS. 3, 4, and 5, the magnetic sensor 40 includes a protective cover 41 that covers the sensor 40 without blocking or altering the magnetic field. The protective cover 41 may be a non-conductive epoxy or material that resists abrasion. FIG. 5 shows the protective cover 41, sensor 40, and sensor wires 42 that run within pole piece 20. The magnetic sensor 40 may also be protected by a pipe 43 that extends into the working gap 36 as shown in FIG. 7. The pipe 43 circumscribes a portion of a corresponding pole piece 20, 22 in the working gap 36 and may be made of a material not magnetically conductive. As shown in FIG. 7, both pole pieces 20, 22 are contained within brass pipes 43. Having the pipes 43 covering the pole pieces 20, 22 not being magnetically conductive helps to prevent the media 12 from potentially hanging onto the pole pieces 20, 22 because there is some separation between the media 12 and the pole pieces 20, 22. Also, having a gap between the pole pieces 20, 22 and the media 12 will help the media 12 drop more responsively when the magnetic field in the working gap 36 is reduced through action of the coils 26, 28.

The Hall chip or magnetic sensor 40 can be placed at the end of one of the pole pieces 20, 22 thus giving a reading of flux in the system as shown in FIGS. 3 and 4. While magnetic sensors 40 are shown on the end of both pole pieces 20, 22, it is contemplated that only one magnetic sensor 40 is used. Locating the magnetic sensor 40 outside of the flow path prevents erosion or damage from media in the flow path. Placing the Hall chip 40 at the end of the pole pieces 20, 22 preserves its integrity while still being able to read the magnetic flux within the pipe. The magnetic flux in the pipe 13 may be from both from the magnets 30, 32 or the single permanent magnet 15 and any flux created by the media captured in the flow path 12. The magnetic sensor 40 can be hall-effect, magneto-resistive, MEMS, or other technology that measures magnetic field strength and/or direction. The magnetic flux in the gap 36 is the sum of the permanent magnet 15, 30, 32 plus the remanence effect of the media. The permanent magnet 15, 30, 32 may be partially or fully cancelled by the coil current.

A valve 18 having a configuration for locating the magnetic sensor 40 outside of the working gap 36 is shown in FIGS. 10-13. In this configuration, pole pieces 29, 31 have extensions 33 that extend beyond the pipe 13 into which the pole pieces 29, 31 extend. This configuration is similar to that shown in FIG. 7 because a single permanent magnet 15 conducts its magnetic flux through spacer blocks 17 into pole pieces 29, 21. The extensions 33 on their corresponding pole pieces 29, 31 bend toward each other toward a magnet sensor 40 located between the extensions 33 and outside of the pipe 13 that contains the flow of media 12. The extensions 33 and magnetic sensor 40 are located on an opposite side of the pipe 13 as the magnet 15. In this manner, the pole pieces 29, 31 conduct magnetic flux from the permanent magnet 15 to the magnetic sensor 40. The pole pieces 29, 31 also conduct any magnetic flux in the working gap 36 from media 12 located within the working gap 36.

Instead of relying on the correlation of the coil current to the flow rate and operating the coils 26, 28 in open-loop, the magnetic sensor 40 measures the actual magnetic field in the working gap 36. This allows closed-loop control of the coils 26, 28. Using a closed loop servo circuit, the coil current can be adjusted to whatever level is necessary so that the magnetic sensor(s) 40 report zero (or near zero) flux from within the working gap 36. A near zero magnetic flux in the working gap 36 should correspond to maximum flow rate of the valve 10, 11, 18. A single magnetic sensor 40 may be sufficient for some applications, but multiple sensors may also be used with other pole piece or valve designs.

By measuring the magnetic field directly in the working gap 36 in real time while the valve 10, 11, 18 is in use, a controller can adjust the current in the coils 26, 28 to compensate for remanence and restore predictable valve operation. A baseline calibration of the valve 10 can be used to correlate magnetic field in the working gap 36 to the electrical current provided to the coils 26, 28. When the valve 10, 11, 18 is considered alone, a certain amount of current will need to be passed through the coils 26, 28 to counteract the magnets 15, 30, 32 that conduct their magnetic flux through the pole pieces 20, 22. As stated above the NFC will be the amount of current provided to the coils 26, 28 to achieve near zero magnetic flux in the working gap 36, and less current than the NFC applied to the coils 26, 28 will yield some magnetic flux 36 in the working gap at a desired level that will restrict the flow of media 12 to a desired rate. Current above the NFC in the coils 26, 28 will also result in a magnetic field in the working gap 36. As high-remanence media enters the working gap 36, the magnetic sensor 40 detects the change in magnetic field. This causes the controller to increase or decrease electrical current to return the magnetic field strength in the working gap 36 to the desired level. The desired level can be from a setpoint determined in the valve or by another component connected to the controller. By adjusting the current in the coils 26, 28, the controller seeks to reduce the difference between the measured field in the working gap 36 and the expected field. Having a predictable level of magnetic field in the working gap 36 is necessary to predictably control the flow of media 12 through the valve 10, 11, 18.

Figure 6:
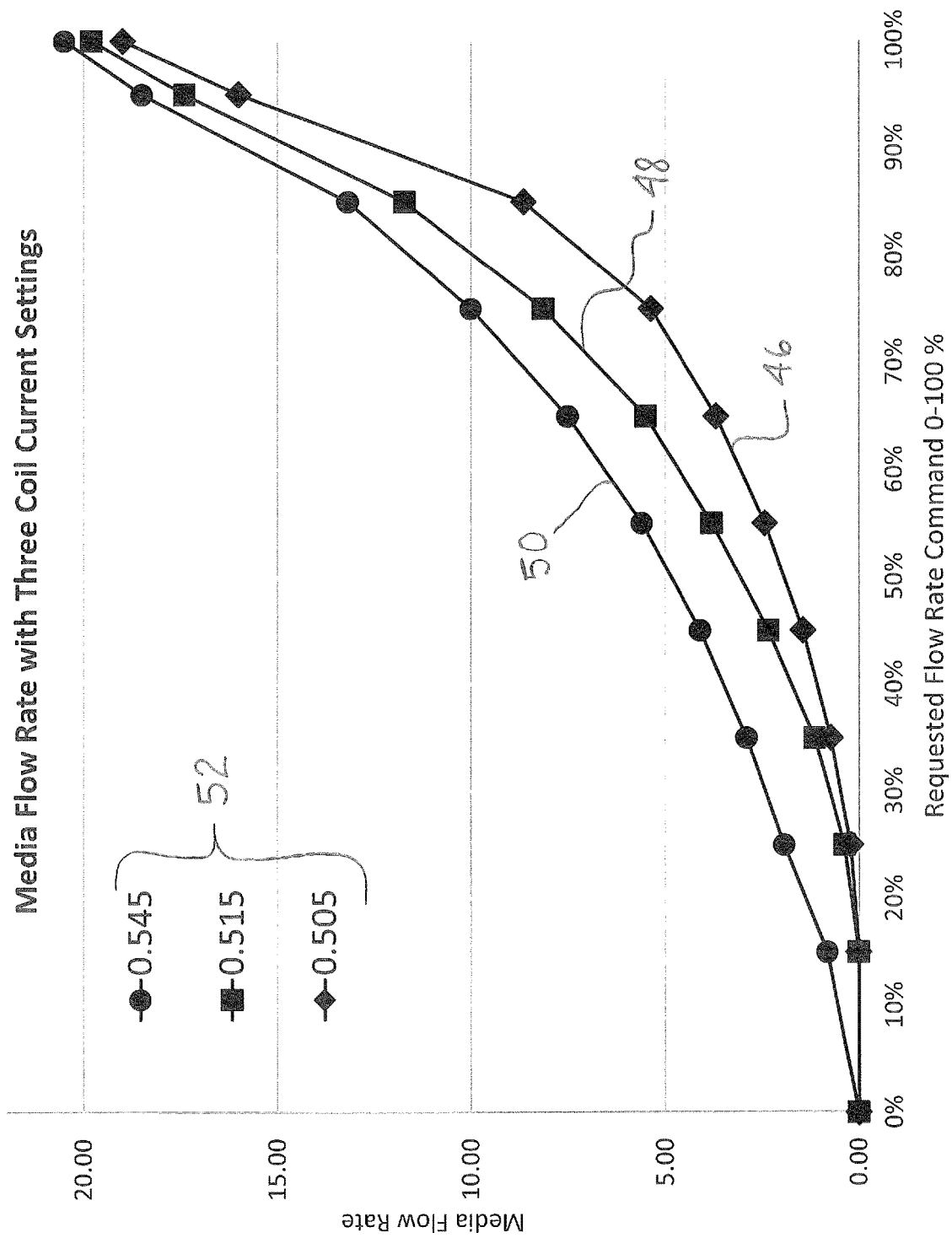
FIG. 6 is a graph showing the compensation values for media flowing through the valve.

The magnetic sensor 40 is also used to compensate for changes in the valve 10, 11, 18. For example, the strength of the magnets 15, 30, 32 may vary over temperature, age, or other conditions. Further, the magnetic properties of the pole pieces 20, 22 and/or coils 26, 28 may change based on environmental, age, or other conditions. The magnetic sensor 40 senses the magnetic field and provides feedback that is used to adjust the electrical current in the coils 26, 28. FIG. 6 shows how changes in the media 12 can affect the functioning of the valve 10, 11, 18.

The graph of FIG. 6 shows the percentage of flow rate as a percentage of full flow rating of the valve. The horizontal axis shows flow rate as a per. The vertical axis shows the flow rate in pounds per minute of media. The graph has three lines showing the response curve for three situations in the valve 10, 11, 18 corresponding to different NFC values. The lowermost graph line 46 shows the response curve for the situation of a valve having a NFC of 0.505 Amps. The middle graph line 48 shows the response curve for a valve having a NFC of 0.515 Amps. The top graph line 50 shows the response curve for a valve having a NFC of 0.545 Amps.

The legend 52 on the graph shows the amperage rating corresponding to each graph line 46, 48, 50. In each case, a higher NFC means that the required input to the coils 26, 28 increases to get the same media flow rate from the valve 10, 11, 18. Having a magnetic sensor 40 to measure the amount of magnetic field required to maintain the NFC in real time allows the valve 10, 11, 18 to predictably control the flow rate because the valve 10, 11, 18 can adjust to the increased current requirements necessary to maintain an expected flow rate in real time.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter within the limits of the following claims.

What is claimed is:

1. A flow control valve comprising:
   a pipe for receiving and directing media therethrough, said pipe having an inlet for receiving said media and an outlet for dispensing said media, said media capable of retaining magnetism and conducting a magnetic field;
   a permanent magnet conducting a magnetic field through a pair of pole pieces, said pole pieces extending through said pipe between said inlet and said outlet and said pole pieces being spaced from each other within said pipe, said pole pieces conducting said magnetic field from said permanent magnet into said pipe, a space being located between said pole pieces within said pipe defining a working gap;
   a coil surrounding a portion of each said pole piece and said coils capable of receiving a current for generating an opposite magnetic field to said magnetic field from said permanent magnet, said current being adjustable from zero to a baseline neutral field current wherein said magnetic field from said permanent magnet is substantially negated by said opposite magnetic field from said coils, said baseline neutral field current corresponding to a maximum flow rate of said media when said media is not magnetized and said baseline neutral field current corresponding to substantially no magnetic field in said working gap when said media is not magnetized;
   a magnetic sensor for measuring magnetic flux within said working gap;
   a controller connected to said sensor and said controller capable of adjusting said current in said coils to a second neutral field current by detecting magnetism in said working gap from magnetized media by said magnetic sensor, said second neutral field current corresponding to substantially no magnetic field in said working gap in the presence of said magnetized media and said second neutral field current corresponding to a current necessary to provide a maximum flow rate in the presence of said magnetized media.

2. The flow control valve of claim 1, wherein said permanent magnet is located outside of said pipe.

3. The flow control valve of claim 1, wherein said magnetic sensor is located outside of said pipe and adjacent to one of said pole pieces.

4. The flow control valve of claim 1, wherein said magnetic sensor is located within said working gap.

5. The flow control sensor of claim 1, wherein said magnetic pole pieces include extensions and said magnetic sensor is located between said extensions of said pole pieces and said extensions of said pole pieces are located outside of said pipe, said permanent magnet and said coils being located outside of said pipe.

6. The flow control sensor of claim 1, wherein said controller adapted for adjusting said current in said coils to compensate for said magnetic flux from said media so that magnetic flux from said media is negated by said current in said coils.

\* \* \* \* \*